United States Patent
Guilhem et al.

[15] 3,686,572
[45] Aug. 22, 1972

[54] PULSE-COMPRESSOR SYSTEM

[72] Inventors: Robert Germain Guilhem, Sceaux; Yvon Pierre Jean Fouché, Chatou, both of France

[73] Assignee: Compagnie Francaise Thomson-Houston

[22] Filed: Oct. 30, 1962

[21] Appl. No.: 235,178

[52] U.S. Cl. ............... 325/321, 328/56, 333/70 T, 343/17.2 PC
[51] Int. Cl. .............................................. H04b 1/16
[58] Field of Search ....... 343/17.2; 333/70 T; 328/58, 328/56; 325/321

[56] References Cited

UNITED STATES PATENTS

| | | |
|---|---|---|
| 2,678,997 | 5/1954 | Darlington.........343/17.2 UX |
| 3,105,967 | 10/1963 | Cook et al. ...............343/17.2 |

*Primary Examiner*—Benjamin A. Borchelt
*Assistant Examiner*—Richard E. Berger
*Attorney*—Karl F. Ross

[57] ABSTRACT

A system for compressing a frequency-modulated pulse signal includes means for separating the signal into a plurality of frequency component signals, a plurality of dispersive media through which the respective signals are passed for compression in a predetermined compression ratio, and means for recombining the compressed component signals into a common output pulse which is a compressed replica of the input pulse.

6 Claims, 6 Drawing Figures

Patented Aug. 22, 1972 3,686,572

INVENTORS:
YVON P.J. FOUCHE
ROBERT G. GUILHEM
BY
Karl G. Ross
AGENT

PULSE-COMPRESSOR SYSTEM

This invention relates to a system for deriving from a frequency-modulated input pulse an output pulse which is a compressed replica of the input pulse.

Since such pulse-compressing operations are of especial utility in radar work, the invention will be more particularly described with reference to radar, but this should not be interpreted as limiting the field of applicability of the invention.

In the so-called compressed-pulse radar techniques, comparatively long transmitted pulses are used, in relation to the range-resolving power desired, and the received echo pulses are then compressed to the desired, narrow pulse width. This has the advantage of providing an accuracy and resolution in range comparable to what is obtainable when using narrow transmitted pulses, while at the same time deriving the benefits of long transmitted pulses operating at high average power levels. No narrow pulses characterized by extremely high peak energy need by transmitted and the attendant pulse-generating difficulties are avoided. In a compressed-pulse radar system, pulses are generated and transmitted with a carrier frequency which is modulated linearly with time about a center value, with a given amount of total variation of the carrier frequency over the duration of pulse transmission. The receiver system includes means for imparting to the received echo signal a delay that is varied linearly with frequency in accordance with a law correlated with the law of frequency modulation applied to the transmitted pulse, so that a greater delay is imparted to the portion of the echo signal corresponding to the start of the transmitted pulse than to the portion corresponding to the termination of said pulse. The net effect is to compress the echo signal on the time scale.

In such a system, there are two basic conditions to be observed if it is desired to obtain a high compression ratio (defined as the ratio of transmitted-pulse duration to receiver-output-signal duration) with satisfactory all around operation. They are a high degree of linearity in the modulation of the transmitted pulse with time ; and a high degree of linearity in the delay applied to the echo signal with frequency.

It is a specific object of this invention to improve this latter condition, i.e. improve the linearity of the delay imparted to a variable-frequency pulse, such as a radar echo pulse of the type described, as a function of frequency.

Usually the frequency-dependent delay imparted to a variable-frequency pulse in order to compress it as described above is obtained by passing the pulse through a suitable dispersive medium introducing a delay variable with the instantaneous frequency of the pulse. However, considerable difficulties are experienced when it is desired to construct such a dispersing medium that will be capable of imparting the desired, accurately linear variation in delay with frequency, in the case of broad frequency bands. The broader the band of the frequency-modulated pulse, the poorer the linearity generally exhibited by the dispersing media. It is an object of this invention to eliminate this limitation.

Further objects of the invention include the following: to increase considerably the maximum compression ratio that may be imparted to a frequency-modulated pulse; to facilitate the design and construction of efficient dispersing units as required in the compression of frequency-modulated pulses for radar and related techniques; to provide a relatively simple, and highly efficient, pulse-compressing system having excellent frequency response and linearity; to provide improved radar receiver systems of the compressed-pulse type.

In accordance with a broad aspect of the invention, a system for compressing a frequency-modulated pulse signal comprises means for separating the signal into a plurality of frequency component signals, a plurality of dispersive media through which the respective component signals are passed to be compressed therein in a predetermined constant compression ratio, and means for recombining the compressed component signals into a common output pulse which is a compressed replica of the input pulse.

The above and further objects, aspects and features of the invention will become apparent as the disclosure proceeds with reference to a specific exemplary embodiment illustrated in the accompanying drawing wherein.

Figure 1:
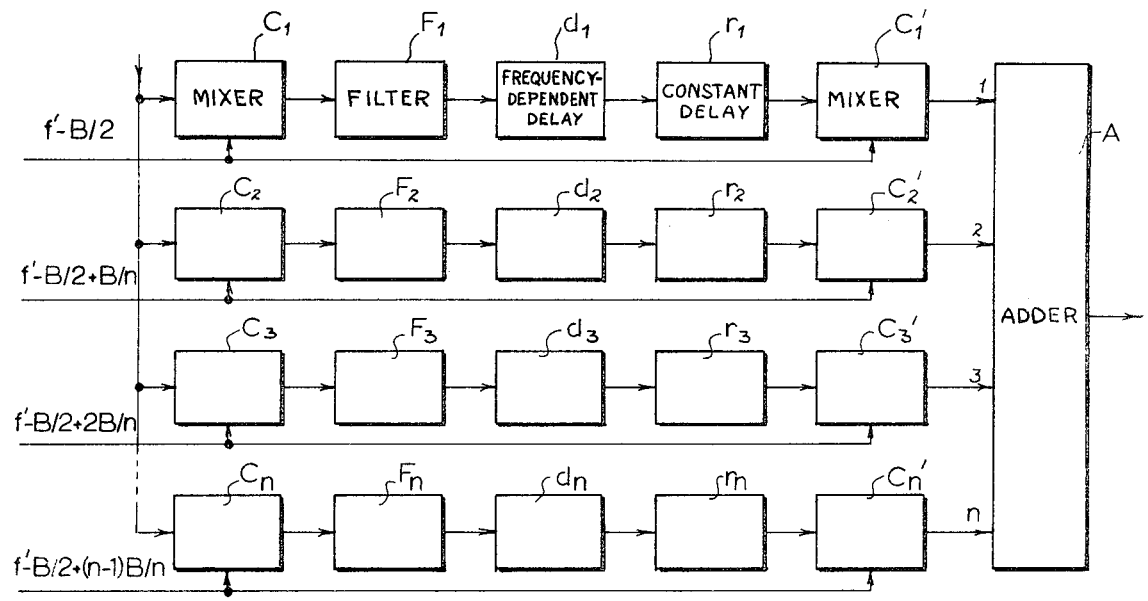
FIG. 1 is a general block diagram of the improved pulse-compressing system.

In accordance with the invention, a frequency-modulated input pulse signal such as an echo signal in a compressed-pulse radar system, is separated into a plurality of component frequency signals applied to respective parallel signal channels; each channel includes a dispersing unit therein which acts to impart to the component signal in the respective channel a compression which owing to the narrow frequency band of the corresponding component signal will exhibit a high degree of uniformity. The compressed component signals from the outputs of all the channels are thereafter recombined, and it will be shown that this re-combining step introduces an additional, and desirable, degree of compression to the signal as a whole. It is known that when compressing a linearly frequency-modulated pulse as used in compressed-pulse radar systems, by means of a dispersing medium imparting a delay that is variable with frequency and correlated with the frequency modulation of the initial pulse, the echo pulse may in theory be compressed to a final width as small as the reciprocal of the carrier frequency. In conventional pulse-compressor systems however, owing to the appreciable width of the frequency band of the modulated pulse, it has not been found possible to provide a dispersing medium capable of imparting the desired maximum compression with the requisite degree of linearity, so that the theoretical limit could not, by far, be approached. The invention makes it feasible to approach quite closely this theoretical limit of maximum compression since it breaks down the initial broadband pulse signal into a plurality of narrow-band component signals, each of which can then easily be handled by a suitable dispersing medium exhibiting the desired linear frequency characteristics in respect to each component frequency signal. The invention will now be described in detail with reference to the drawing.

Figure 2:
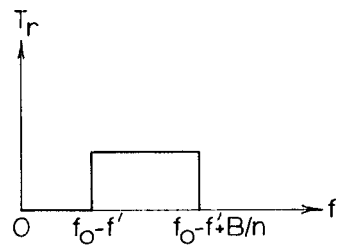
FIG. 2 shows a frequency response curve of filters used in the system.

As shown in FIG. 1, an input signal S (e.g. 3db in strength) is applied simultaneously to the inputs of a plurality of parallel channels identified by the numerals 1 through n. The corresponding component units in all the channels are designated by the same letter references with a subscript identifying the channel. The foremost component of each channel is a frequency converter $C_1$, $C_2$, $C_3$....$C_n$ in which the incoming signal is mixed with a local frequency. According to a preferred aspect of the invention, the local frequencies applied to the n frequency converters $C_1$ through $C_n$ of the respective channels are displaced in accordance with an arithmetic series. More specifically, if the input signal S has an instantaneous frequency varying in the range from $f_o - B/2$ to $f_o + B/2$ over the duration T of the transmitted pulse, then there is used as the first local frequency applied to mixer $C_1$ a frequency $(f' - B/2)$, as the local frequency applied to mixer $C_2$ a frequency $f' - B/2 + B/n$, and so on with the local frequency applied to mixer $C_n$ being a frequency of $f' - B/2 + (n - 1)(B/n)$. As a result, the elementary component signal delivered into each channel can be shown to have a linear frequency variation from a value $(f_o - f')$ to a value $(f_o - f' + B/n)$ over a time interval of $T/n$. These component signals are then passed through respective filters $F_1$, $F_2$, $F_3$...$F_n$ each having a pass band corresponding to the range of frequency variation of the signal in the associated channel, as will be evident from FIG. 2, which shows the frequency response for filter $F_n$ in the nth channel. The filtered component signals are then applied to respective dispersing units $d_1$ ... $d_n$ which serve to compress the signals in a ratio m, in a manner well-known per se. It will thus be seen that in each channel, the major portion of the energy content of the signal is transmitted during a time interval $T/m \cdot 1/n$.

Figure 3:
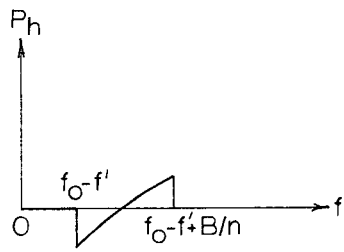
FIG. 3 illustrates a corresponding phase-displacement curve.

It is important for the attainment of the foregoing result that the filters $f_1$ ... $F_n$ shall not introduce any non-linear dispersion of their own. For that purpose it is preferred that the curve of phase displacement Ph against frequency $f$ within the pass band of each filter should be of the linear symmetrical shape indicated in FIG. 3 for the nth filter $F_n$.

The compressed component frequency signals derived from the dispersing units $d_1$ ... $d_n$ are then passed through constant delay networks $r_1$, $r_2$, $r_3$, $r_n$ which introduce into each signal an additional delay independent of frequency, the amount of said additional delay being varied across the channels as a degressive arithmetic series of ratio $T/n$, being greatest for channel Nos. 1 and least for channel No. $n$. The signals are thereafter applied to output mixers or frequency converters $C'_1$, $C'_2$, $C'_3$ ... $C'_n$ in which they are mixed with the same local frequencies as in the input mixers C. This ensures that the outputs from all the channels have the same frequencies as at the input to the channels.

Owing to the manner in which the output signals were formed and specifically to the additional frequency-independent delays imparted to them in the networks $r_1$ ... $r_n$, it can be shown that all the output signals from the output frequency converters C' are coincident during a time interval of $T/mn$ starting at the instant ($t_o + T + t'$) and terminating at the instant ($t_o + T + t' + T/mn$), ), where T is the width of the transmitted pulse, $t'$ is a maximum delay introduced by the non-dispersive media traversed by the signals plus the average delay introduced by the dispersive media, and $T/mn$ represents the duration of the signal in each channel as earlier indicated.

It will be understood therefore that the component signals may all be re-combined at the outputs from the channels to provide a common, usable compressed output signal. This final re-combining step is performed in a conventional vectorial adder circuit a supplied with the outputs from all the channels as shown.

It should be noted that the final vectorial addition of the component signals will introduce a further compression, in a ratio equal to $n$, in additional to the compression imparted by the respective dispersive media. This can be shown as follows. In the final adding or combining step, the amplitude vectors of the respective signals are added during the selected time interval $T/mn$, while said signals are being subjected to a linear phase variation such that substantially at the midpoint of said time interval all the signals are in phase. At that instant the co-phasal component signals can be represented as the series of aligned vectors indicated FIG. 4. Since the mean frequencies of the signals are displaced, throughout the interval under consideration, in accordance with an arithmetic series of ratio $B/n$, it will be apparent that after a certain time period $\Delta t$, the vector having the highest frequency of the series has assumed a phase lead of $\pi$ over the vector having the lowest frequency. The vector diagram will then have assumed substantially the shape indicated in FIG. 5, which shows the signal vectors positioned on a regular polygonal line inscribable in a semi-circle, and substantially coincident with such semi-circle provided $n$ is large enough. Since the total length of the series chain of vectors must necessarily be conserved unaltered, it will be readily understood that the resultant signal, in the configuration of FIG. 5, is smaller by a factor of $2/\pi$ than the maximum value of the resultant signal when all the vectors are co-phasal as in FIG. 4.

Figure 4:
FIGS. 4, 5 and 6 are respective vector diagrams illustrating various configurations of the voltage-amplitude vectors obtained on combining the individual frequency-component signals at the output of the system.
Figure 5:
Figure 6:

Thus, in the condition indicated in FIG. 5, the output amplitude of the signal has been reduced by an amount of 3db in the example assumed above. Moreover, some time prior to the instant at which the signals are co-phasal as shown in FIG. 4, it will be evident, bearing in mind that the phase variations are linear, that there is present a vector configuration symmetrical with respect to that shown in FIG. 5, as indicated by the graph of FIG. 6, when the total amplitude of the resultant signal also is 3db less than that of the sum of co-phasal vectors of FIG. 4. The total duration of the resultant pulse, between the end instants represented by the vector configurations of FIGS. 5 and 6 respectively, must then be such as to allow the vector representing the highest frequency of the series to described one more revolution than the vector representing the lowest frequency. Since the frequency difference is $B$, the said total duration is $1/B$. On the other hand, since the frequency variation in any channel is $B/n$, the width of the compressed pulse in any channel is not less than $1/(B/n)$ or $n/B$. It is evident therefore that the summation of the output signals from the $n$ channels has introduced an additional compression in the ratio $n$.

It will be clear from the foregoing that the invention has provided an improved system for compressing radar frequency-modulated pulses, capable of achieving maximum compression ratios in a simple and effective manner, through the use of a plurality of dispersive units simple to design construct and to operate reliably.

While the invention has especial value in connection with radar techniques, it will be easily understood that it may be usefully applied to any system in the broad field of pulse transmission systems where a constant compression ratio for frequency-modulated energy pulses may be required. Further, it will be understood that the system schematically shown in FIG. 1 is mainly exemplary, and that various changes may be made in it without exceeding the scope of the invention, as by omitting or interchanging one or more of the steps shown and/or introducing other steps, to suit specific applications.

What we claim is:

1. A system for compressing a frequency-modulated input pulse signal, comprising means for separating the input signal into a plurality of frequency component signals; means passing each component signal through a related dispersive medium to compress the component signal in a predetermined compression ratio; and means for recombining the compressed component signals into an output pulse signal which is a compressed replica of the input signal.

2. A system for compressing a frequency-modulated input pulse signal, comprising means defining a plurality of channels having said input signal applied in parallel thereto; each channel including a frequency converter having the input signal applied to one input thereof and a local oscillation of predetermined frequency, different for each channel, applied to a second input thereof whereby to separate the input signal into a plurality of component signals in the respective channels; dispersive means in the respective channels connected to be traversed by said component signals to compress the latter in a prescribed compression ratio; and means for recombining the compressed component signals into an output pulse signal which is a compressed replica of the input pulse signal.

3. The system claimed in claim 2, wherein said local oscillations applied to the frequency converters in the respective channels have frequencies displaced in accordance with an arithmetic series.

4. The system claimed in claim 2, wherein each channel further includes a delay unit connected to the output of the dispersive means for imparting to the compressed component signal an additional delay independent of the instantaneous frequency of the component signal.

5. A system for compressing a variable-frequency input signal, comprising means defining a plurality of parallel channels each including a frequency converter having the input signal applied to one input thereof and having respective local oscillations applied to second inputs thereof whereby to separate the input signal into a plurality of component signals in the respective channels; said local oscillations having frequencies displaced in accordance with an arithmetic series; dispersing means in the respective channels connected to be traversed by said component signals to compress the latter in a prescribed constant ratio; delay units in the respective channels for imparting to the component signals additional delays independent of the instantaneous frequency of said signals, by amounts displaced as between the channels in accordance with an arithmetic series generally reverse from said first arithmetic series; further frequency converters in the respective channels connected for mixing the compressed delayed component signals with said respective local oscillations so as to restore thereto the frequency of said input signal; and means for vectorially combining the outputs from the respective channels into an output signal, thereby introducing further compression.

6. The system claimed in claim 2, wherein each channel includes a band-pass filter associated with said frequency converter for improving the separation of said component signals.

* * * * *